Dec. 8, 1964  A. FRATE ETAL  3,160,184
ROTARY COMMINUTOR
Filed Aug. 8, 1963

INVENTORS
ANTHONY FRATE &
NICHOLI THOMPSON
BY
Busser, Smith + Harding
ATTORNEYS

3,160,184
ROTARY COMMINUTOR
Anthony Frate, 3331 N. Marshall St., and Nicholi Thompson, 2213 N. Broad St., both of Philadelphia, Pa.
Filed Aug. 8, 1963, Ser. No. 300,792
9 Claims. (Cl. 146—123)

This invention pertains generally to the comminution, grating or shredding of foodstuffs, and particularly of foodstuffs of a solid or semi-solid character. It will be described more particularly, for purposes of illustration, in connection with the subdivision into relatively finely divided particles of cheese, it being understood that the invention in its broad concept is not so limited as will hereinafter appear.

The manufacture of cheese is a highly developed art that has been practiced over the centuries, differences in techniques resulting in products of the widest range in quality and preference from the epicurean point of view. But irrespective of how made, it may be deemed to be a solid from the standpoint of being a mass of matter of which its shape, irrespective of its geometry, cannot be changed permanently and greatly without fracture.

While considerable volumes of cheese are sold from the grocery shelf in comminuted pre-packaged form, there is a decided preference on the part of many for freshly comminuted cheese, when it is to be used in this form, much the same as in the case of freshly ground coffee.

Various devices for the comminution of cheese, whether for packaging or for direct use, have been heretofore devised, but none, insofar as we are aware, have met the previously existing desideratum for a device that is highly efficient in operation while embodying simplicity in construction together with wide choice as to size, to meet various demands as to capacity; a device capable of close control as to particle size, low in operating cost, and readily disassembled for cleaning purposes with parts so constructed as to make cleaning a simple operation.

These and other objects of the invention are achieved by providing a rotary comminuting mechanism comprised of a plurality of cutter plates secured together in face to face relationship, each plate being provided peripherally with a plurality of spaced diagonal cutting edges.

Wide versatility is afforded with respect to the arrangement of cutter plates relative to each other in a series, a typical arrangement being such that the cutting edges on each succeeding plate in a series are staggered circumferentially relatively to the cutting edges on its preceding plate.

The cutter plates may have peripheral shapes corresponding, generally speaking, to regular polygons, that is polygons in which all angles and sides are equal, of which the equilateral triangle, the square, the regular pentagon, the regular hexagon, the regular heptagon, and the regular octagon are examples, the cutter plates in any one rotary mechanism preferably being, within at least practical approximation, congruent, that is of the same size and shape.

The use of a regular polygonal shape is particularly advantageous from a manufacturing standpoint in that diagonal cutting edges may be provided at its corners by merely beveling its sides, albeit with some departure from an exact regular polygonal shape. For convenience in description and in the claims the term "regular polygon" and the like, is intended to include such departures in shape. The same applies to these terms when modified by the word "generally" such as "generally regular polygon" or "generally regularly polygonal," etc.

It is particularly advantageous to select regular polygonal shapes having sides of even number, such as the square, the regular hexagon, the regular octagon, etc. Since each side of a polygonally shaped blank or plate has two edges due to thickness, one such latter edge bounding a face on the blank or plate that is opposite to the face bounded by the other, this makes it possible to alternate the beveling of each succeeding side relative to the beveling of its preceding side around the periphery of the blank or plate, with the result that each succeeding cutting edge on a cutting plate slopes in a direction having an axial component opposite to that of its preceding cutting edge.

Further features of the invention will become apparent as the specification proceeds in connection with the drawings in which.

Figure 1:
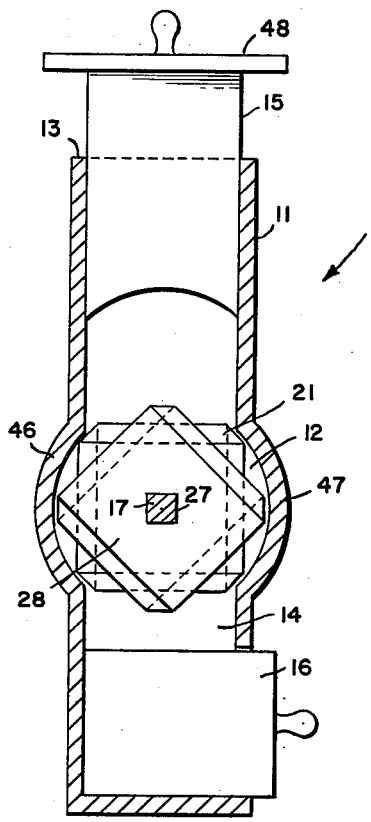
FIGURE 1 is an elevation partly in section of a foodstuffs comminuter of the invention.

Referring now more particularly to the drawings, at 10 is shown a foodstuffs comminutor comprised of a housing 11, and a rotary comminuting mechanism 12 situated therein.

Housing 11 has an inlet 13 at its top for the feeding of foodstuffs to be comminuted, and an outlet 14 at its bottom for the withdrawal of foodstuffs in comminuted form.

A feeding plunger 15 is dimensioned for downward sliding movement in the upper part of housing 11 above rotary mechanism 12, said plunger entering said housing through inlet 13.

Outlet 14 of housing 11 is fitted with a slidable collecting container 16 for the collection and withdrawal of comminuted foodstuffs.

Rotary mechanism 12 is comprised of a shaft 17 mounted in bearings 18 positioned in opposite walls of housing 11, and upon which are arranged face to face a plurality of cutter plates 19. For convenience in description, cutter plates 19 are shown as being congruent, and as having regular polygonal shapes with even number of sides, i.e. square. As shown, adjacent plates 19 are staggered circumferentially with respect to each other, that is, when counting the cutter plates, say from left to right, odd numbered plates are staggered circumferentially relative to even numbered plates. Moreover, as shown, each odd numbered plate is in line, in axial direction, with each other odd numbered plate, and each even numbered plate is in line, in axial direction, with each other even numbered plate. Furthermore, two different arrangements of plates with respect to each other are illustrated, there being various others available, as will become apparent to persons skilled in the art as the specification proceeds.

It will be understood that, irrespective of the plate arrangement adopted, shaft 17, within the area of housing 11, will be completely filled up with cutter plates 19 preferably in contact face to face.

Figure 3:
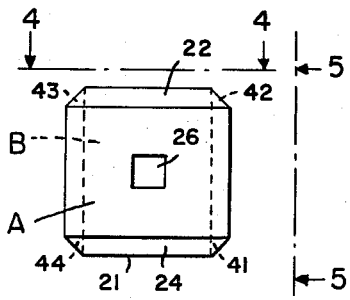
FIGURE 3 is a plan view of a typical cutter plate.
Figures 4, 5:
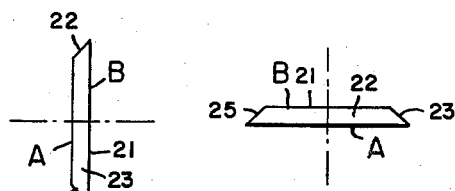
FIGURE 4 is a view taken on line 4—4 of FIGURE 3.
FIGURE 5 is a view taken on line 5—5 of FIGURE 3.

Coming now to a typical cutter plate, reference is had to FIGURES 3 to 5, wherein cutter plate 21 is shown as having a regular polygonal peripheral shape, as defined herein, as well as an even number of sides, it being generally square.

Cutter plate 21 may be of any suitable material, such as steel, iron, stainless steel, hardened plastic, e.g. the product known in the trade as Bakelite, and the like.

The respective sides of plate 21 are beveled, and , as shown, each succeeding side is beveled, in axial direction, oppositely to the beveling of its preceding side.

Thus the beveling on side 22, as seen in FIGURE 3, slopes forwardly and toward the axis from the rear face B of cutter plate 21 toward its front face A, whereas the beveling on side 23 which is next succeeding in clockwise direction slopes rearwardly and toward the axis from the front face A of plate 21 toward its rear face B. The next succeeding side, namely side 24, has a bevel similar to that of side 22, i.e. opposite to that of side 23, and the next succeeding side in order, namely side 25, has a bevel similar to side 23, i.e. opposite to those of sides 22 and 24 respectively. It will be noted that when proceeding in counterclockwise direction the same relationship between each succeeding beveled side to its preceding beveled side obtains, as is the case with all regular polygonal shapes having an even number of sides, whether proceeding clockwise or counterclockwise about the periphery.

Cutter plates 19 may be mounted on shaft 17 in any desired manner for rotation therewith. For instance, that portion of shaft 17 within the inner walls of housing 11 may be of square cross-section in which case plates 19 may be provided with square apertures at their centers just sufficiently large for a sliding fit over the square portion of said shaft. Staggering of adjacent cutter plates relative to each other may then be accomplished by staggering the circumferential positions of the square apertures in the respective plates relative to each other. For instance, aperture 26 in plate 21 is shown with sides parallel to the sides of plate 21, whereas aperture 27 in plate 28, seen in FIGURE 2, has been shifted circumferentially such that its diagonals intersect the sides of plate 28, a rotation of 45°. The resulting relative positions of plates 28 with respect to plates 21 can be seen in FIGURE 2. Also the result of alternating such plates on shaft 17 in two suggested variations is illustrated in FIGURE 1.

Mechanism 12 may be rotated in any desired manner, e.g. by a prime mover or by hand. An electric motor 31 illustrated as connected to shaft 17 by means of collar 32 is particularly suitable and convenient for the purpose.

It is to be understood that the means for mounting mechanism 12 in housing 11, or its equivalent, is subject to wide variation, and that the structure shown has been adopted in large measure for brevity and simplicity in description, as well as to better illustrate the outstanding features of the invention. Thus while it will occur to persons skilled in the art upon becoming familiar with this invention that the assembly of rotary mechanism 12 in housing 11 for operative purposes, and its disassembly from housing 11 for cleaning purposes, may be somewhat facilitated by change in design and structure, albeit with increase in the number of parts, and possibly in the cost of manufacture, the assembly and disassembly of the device as shown is nevertheless a simple operation.

To illustrate upon reference to FIGURE 2, disassembly may be accomplished as follows. Upon removal of motor 31, collar 32 and collar 33, the latter being removably affixed to shaft 17 to reduce or prevent endplay. shaft 17 along with left hand bearing 18 may be moved to the left as seen in FIGURE 1, cutter plates 19 dropping to the bottom of housing 11, with container 16 removed, or caught by hand as they are released from shaft 17. For assembly purposes, the reverse operation is performed, cutter plates 19 being slipped onto shaft 17 in the order desired as shaft 17 is moved to the right. Left hand bearing 18 is again secured in housing 11, collar 34 which functions similarly to collar 33 in reducing or preventing end play remaining in position during the entire operation. Upon connecting motor 31 to shaft 17 by way of collar 32, reassembly is complete.

Coming now to the operation of the invention, it will be understood that the corners of a regular polygon are not only equidistant from the center, but also are the furthest from the center of any portion of the figure. It follows that the function of comminution is virtually confined to such corners when comminuting mechanism 12 is in operation. Thus the aforementioned beveling may be confined to such corners, if desired, but as a practical matter, particularly when grinding is employed for beveling purposes, it is frequently much simpler to bevel the entire side of the cutter plate.

It also will be understood upon mature contemplation that it is the trailing end of any side of a rotating regular polygon (irrespective of direction of revolution) that comes into contact with the foodstuff being comminuted. It is, therefore, the configuration of the trailing end of a side, and particularly of its terminus that is the controlling factor in the determination of the manner in which comminution is effected. As brought out above, such terminus should be diagonal relative to the axis of rotation, or, otherwise stated, diagonal or oblique to a plane passing through the axis of rotation. As a result such diagonal terminus upon contact with the foodstuff exerts shear stresses and strains having a component parallel to the axis of rotation, and when, as in the preferred embodiment, the slopes of succeeding termini alternate around the cutter plate, the component parallel to the axis is caused to reciprocate back and forth across the face of the foodstuff as the cutter plate revolves with outstanding comminuting effectiveness and highly desirable results.

Referring again to FIGURES 3 to 5, and assuming that cutter plate 21 is rotated in clockwise direction as seen in FIGURE 3, it will be noted that the trailing end or terminus 41 of the bevel on side 24 will cause an axial component of shear upwardly vertical to FIGURE 3; that the trailing end or terminus 42 of the bevel on side 23 will cause an axial component of shear downwardly vertical to FIGURE 3; that trailing end or terminus 43 of the bevel on side 22 will cause an axial component of shear upwardly vertical to FIGURE 3, the same as 41; and that the trailing end of terminus 44 of the bevel on side 25 will cause an axial component of shear downwardly vertical to FIGURE 3, the same as 42; thus producing the above-mentioned reciprocation of shear across the face of the foodstuff undergoing comminution.

As can be clearly seen from the above, the same result is produced upon the rotation of cutter plate 21 counterclockwise, the trailing ends or termini now being on the opposite ends of the respective bevels.

Figure 2:
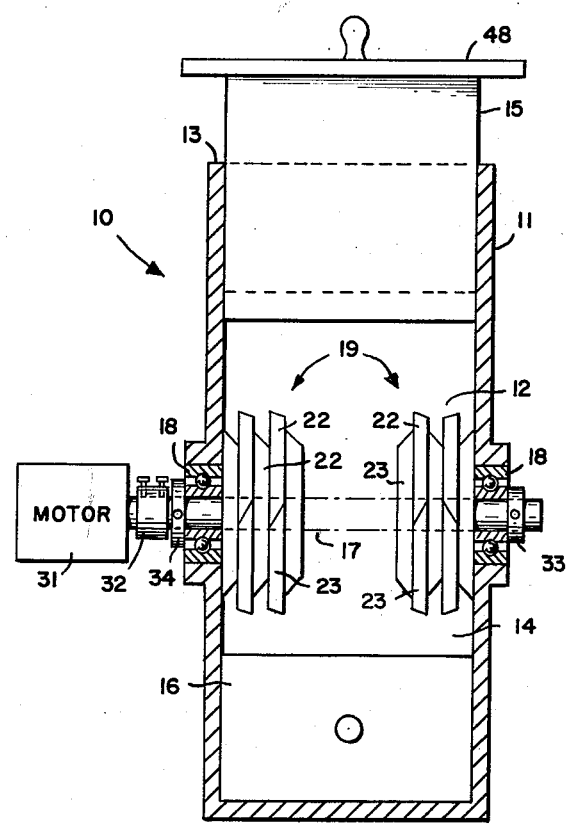
FIGURE 2 is an end view, also partly in section.

As has been mentioned, the cutter plates, such as a plurality of cutter plates 21, indicated at 19 in FIGURE 2, may be arranged on shaft 17 in any desired sequence, two such arrangements being illustrated. Of these two, the arrangement on the right produces finer particles than the one on the left, thus affording choice as to particle size.

The cutter plates may be of any desired dimensions, depending upon the desired capacity of the device, and the desired degree of comminution or particle size. For ordinary grocery store or home use, regular polygonal shapes of from one inch to two inches in diameter with plate thicknesses of from $1/16''$ to $1/4''$ are quite suitable.

While not essential for all types of comminution, housing 11 is preferably provided with portions 46 and 47 adjacent to mechanism 12, said portions having cross-sections conforming to arcs of circles of somewhat greater diameter, e.g. slightly greater, than the diagonal dimension of the cutter plates, so as to provide clearance for rotation. The purpose is to prevent passage without comminution of chunks that might be present or might be broken off during comminution.

In the use of the device, plunger 15 is removed to permit feeding into housing 11 of the foodstuff to be comminuted, which may be intermittent if desired, feeding plunger 15 in either event being employed to push the foodstuff downward into contact with the rotating mechanism. By providing cap 48 on plunger 15 as a stop, and limiting the length of the plunger, it can be kept out of contact with the rotating mechanism 12.

It will be understood that all parts may be of any suitable materials, wood for plunger 15 and metal for all other parts being quite suitable.

Having particularly described the preferred embodiment of the invention wherein adjacent diagonal cutting termini or edges grouped in line circumferentially of the rotating comminuting mechanism have axial components of direction opposite to each other, it is to be understood that this is subject to variation. Thus certain advantages of the invention may be realized even though such termini or edges are not actually adjacent. Then too some but certainly not all of the advantages of the invention may be realized even though such diagonal cutting termini or edges with opposite axial components of direction are not actually in line circumferentially, such as would be achieved by beveling the sides of the individual plates in the same direction, that is not alternately around the periphery, and arranging adjacent plates on shaft 17 with the diagonal termini or edges on one plate having axial components of direction opposite to those on the next adjacent plate or plates.

Therefore, having particularly described a preferred embodiment of the invention, it is to be understood that this is by way of illustration and not of limitation, and that changes, omissions, additions, substitutions and/or other modifications may be made without departing from the spirit thereof. Accordingly it is intended that the patent shall cover, by suitable expression in the claims, the various features of patentable novelty that reside in the invention.

What is claimed is:

1. A foodstuffs comminutor of the kind described comprising a housing, a rotating comminuting mechanism within said housing having an axis positioned transversely thereof, a plurality of cutter plates mounted on said axis transversely thereof and in contact face to face, said cutter plates being generally congruent and having peripheries generally of regular polygonal shape with equal number of sides, diagonal cutting termini on the trailing ends of the sides of each said cutter plate, said ends being trailing relative to the direction of rotation of said comminuting mechanism, adjacent diagonal cutting termini on each said cutter plate having axial components of direction opposite to each other, said housing on opposite sides of said diagonal cutting termini being curved and positioned closely to the path of rotation of said termini, means for feeding foodstuffs into said housing and into contact with said comminuting mechanism, and means for collecting and removing comminuted foodstuffs from said housing.

2. A foodstuffs comminutor of the kind described comprising a housing, a rotating comminuting mechanism within said housing having an axis positioned transversely thereof, a plurality of cutter plates mounted on said axis transversely thereof, said cutter plates being generally congruent and having peripheries generally of regular polygonal shape with equal number of sides, diagonal cutting termini on the trailing ends of the sides of each said cutter plate, said ends being trailing relative to the direction of rotation of said comminuting mechanism, said diagonal cutting termini on each said cutter plate having axial components of direction opposite to each other, said housing on opposite sides of said diagonal cutting termini being curved and positioned closely to the path of rotation of said termini, means for feeding foodstuffs into said housing and into contact with said comminuting mechanism, and means for collecting and removing comminuted foodstuffs from said housing.

3. A foodstuffs comminutor of the kind described comprising a housing, a rotating comminuting mechanism within said housing having an axis positioned transversely thereof, a plurality of cutter plates mounted on said axis transversely thereof, said cutter plates being generally congruent and having peripheries generally of regular polygonal shape, diagonal cutting termini on the trailing ends of the sides of each said cutter plate, said ends being trailing relative to the direction of rotation of said comminuting mechanism, said diagonal cutting termini on each said cutter plate having axial components of direction opposite to each other, means for feeding foodstuffs into said housing and into contact with said comminuting mechanism, and means for collecting and removing comminuted foodstuffs from said housing.

4. A foodstuffs comminutor of the kind described comprising a housing, a rotating comminuting mechanism within said housing having an axis positioned transversely thereof, a plurality of cutter plates mounted on said axis transversely thereof, said cutter plates being generally congruent, diagonal cutting termini on the trailing ends of the sides of each said cutter plate, said ends being trailing relative to the direction of rotation of said comminuting mechanism, said diagonal cutting termini on each said cutter plate having axial components of direction opposite to each other, means for feeding foodstuffs into said housing and into contact with said comminuting mechanism, and means for collecting and removing comminuted foodstuffs from said housing.

5. A foodstuffs comminutor of the kind described comprising a housing, a rotating comminuting mechanism within said housing having an axis positioned transversely thereof, a plurality of cutter plates of polygonal shape mounted on said axis transversely thereof, diagonal cutting termini of opposite axial components of direction on the trailing ends of the sides of each said cutter plate, said ends being trailing relative to the direction of rotation of said comminuting mechanism, means for feeding foodstuffs into said housing and into contact with said comminuting mechanism, and means for collecting and removing comminuted foodstuffs from said housing.

6. A foodstuffs comminutor of the kind described comprising a housing, a rotating comminuting mechanism within said housing having an axis positioned transversely thereof, a plurality of diagonal cutting edges on the periphery of said comminuting mechanism distributed in groups along said axis, each group arranged transversely of said axis with its cutting edges in line circumferentially, adjacent diagonal cutting edges in line circumferentially of said comminuting mechanism having axial components of direction opposite to each other, said housing on opposite sides of said diagonal cutting edges being curved and positioned closely to the path of rotation of said edges, means for feeding foodstuffs into said housing and into contact with said comminuting mechanism, and means for collecting and removing comminuted foodstuffs from said housing.

7. A comminutor of the kind described comprising a housing, a rotating comminuting mechanism within said housing having an axis positioned transversely thereof, a plurality of diagonal cutting edges on the periphery of said comminuting mechanism distributed in groups along said axis, each group arranged transversely of said axis with its cutting edges in line circumferentially, said diagonal cutting edges on said comminuting mechanism having axial components of direction opposite to each other, means for feeding foodstuffs into said housing and into contact with said comminuting mechanism, and means for collecting and removing comminuted foodstuffs from said housing.

8. A foodstuffs comminutor of the kind described comprising a housing, a rotating comminuting mechanism within said housing, said rotating mechanism being comprised of a plurality of cutter plates of polygonal shape mounted face to face transversely of the axis of said rotating mechanism with the corners on adjacent cutter plates staggered relative to each other, diagonal cutting edges on corners of each said cutter plate, at least one said cutting edge having an axial component of direction opposite to that of another said cutting edge, means for feeding foodstuffs into said housing and into contact with said comminuting mechanism, and means for collecting and removing comminuted foodstuffs from said housing.

9. The foodstuffs comminutor of claim 8 wherein the cutter plates have shapes corresponding generally to regular polygons having sides of even number, and wherein diagonal cutting edges having opposite axial components of direction alternate from corner to corner around each cutter plate.

References Cited by the Examiner
UNITED STATES PATENTS

| | | | |
|---|---|---|---|
| 779,625 | 1/05 | Scheetz | 146—121 |
| 1,477,502 | 12/23 | Killick | 146—71 |
| 1,845,636 | 2/32 | Walker | 146—123 XR |
| 2,121,453 | 6/38 | Sundstrand | 146—122 |
| 2,771,111 | 11/56 | Seyfried | 146—68 |

J. SPENCER OVERHOLSER, *Primary Examiner.*